United States Patent
Condict et al.

(10) Patent No.: US 10,042,721 B2
(45) Date of Patent: Aug. 7, 2018

(54) PEER-TO-PEER REDUNDANT ARRAY OF INDEPENDENT DISKS (RAID) LACKING A RAID CONTROLLER

(71) Applicant: Lenovo Enterprise Solutions (Singapore) PTE. LTD., New Tech Park (SG)

(72) Inventors: Michael Neil Condict, Hurdle Mills, NC (US); David W. Cosby, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 177 days.

(21) Appl. No.: 15/084,908

(22) Filed: Mar. 30, 2016

(65) Prior Publication Data
US 2017/0286237 A1    Oct. 5, 2017

(51) Int. Cl.
*G06F 11/00*    (2006.01)
*G06F 11/16*    (2006.01)
*G06F 3/06*    (2006.01)

(52) U.S. Cl.
CPC .......... *G06F 11/1662* (2013.01); *G06F 3/065* (2013.01); *G06F 3/0619* (2013.01); *G06F 3/0653* (2013.01); *G06F 3/0689* (2013.01); *G06F 2201/805* (2013.01)

(58) Field of Classification Search
CPC ............. G06F 11/1662; G06F 11/1658; G06F 3/0619; G06F 3/065; G06F 3/0653; G06F 3/0689; G06F 3/0614; G06F 3/0646; G06F 3/0683; G06F 2201/805; G06F 17/30209; G06F 2211/105
See application file for complete search history.

(56) References Cited

U.S. PATENT DOCUMENTS

| 6,151,659 | A | * | 11/2000 | Solomon | ............... | G06F 3/0622 |
| | | | | | | 710/200 |
| 2005/0193128 | A1 | | 9/2005 | Dawson et al. | | |
| 2006/0282636 | A1 | | 12/2006 | Yamamoto et al. | | |
| 2007/0206224 | A1 | | 9/2007 | Nagashima et al. | | |
| 2018/0107409 | A1 | | 4/2018 | Condict et al. | | |

(Continued)

OTHER PUBLICATIONS

U.S. Appl. No. 15/295,596, filed Oct. 17, 2016, 68 pp.

(Continued)

*Primary Examiner* — Bryce P Bonzo
*Assistant Examiner* — Anthony J Amoroso
(74) *Attorney, Agent, or Firm* — Jason Friday

(57) ABSTRACT

Programmable disk drives are configured within a peer-to-peer redundant array of independent disks (RAID) that lacks a RAID controller. A spare programmable disk drive not part of the RAID can monitor a given drive of the RAID. If the monitored drive fails, the spare drive can replace the failed drive within the RAID such that it becomes part of the RAID, and reconstruct the data on the programmable disk drive that has failed by communicating with the other drives of the RAID. For each data block to be reconstructed, each such other drive may receive just one piece of data and sends just one piece of data. Further, the spare drive may receive just one piece of data for each data block to be reconstructed, which is the data block as reconstructed from one of the other drives of the RAID.

20 Claims, 6 Drawing Sheets

(56) References Cited

U.S. PATENT DOCUMENTS

2018/0143776 A1     5/2018    Caporale et al.
2018/0150244 A1     5/2018    Caporale et al.

OTHER PUBLICATIONS

U.S. Appl. No. 15/357,267, filed Nov. 21, 2016, 69 pp.
U.S. Appl. No. 15/365,333, filed Nov. 30, 2016, 68 pp.
U.S. Appl. No. 15/406,299, filed Jan. 13, 2017, 62 pp.
U.S. Appl. No. 15/451,718, filed Mar. 7, 2017, 65 pp.
Brown, K. , "Fabric Attached Storage: The Convergence of NAS & SAN", COMNET Washington DC., Jan. 28, 2002, 15 pp.
Cooke, A., "An Introduction to Scale-Up vs. Scale-Out Storage", Enterprise Storage Guide, online <http://www.enterprisestorageguide.com/introduction-scale-vs-scale-storage>, Mar. 6, 2014, 5 pp.
Wilmsen, M., "Hyper converged vs. traditional SAN/NAS?", Virtual Hike, online <http://virtual-hike.com/hyper-converged-or-a-traditional-sannas/>, Jun. 4, 2015, 2 pp.
Crowley, P. "Programmable Peripheral Devices," http://www.cs.wustl.edu/~pcrowley/papers/generals.pdf, dated no later than May 14, 2014.
"Hot spare", Wikipedia.com, <https://en.wikipedia.org/wiki/Hot_spare>, last edited Nov. 13, 2015, accessed Jan. 11, 2016, 2 pp.
Rashmi, K.V. et al., "A "Hitchhiker's" Guide to Fast and Efficient Data Reconstruction in Erasure-coded Data Centers", SIGCOMM'14, Aug. 17-22, 2014, Chicago, USA, 12 pp.
Khasymski, A. et al., "Realizing Accelerated Cost-Effective Distributed RAID", Handbook on Data Centers. Springer New York, 2015. 24 pp.
Yu Hu, Xiao et al., "Efficient Implementations of the Sum-Product Algorithm for Decoding LDPC Codes", IBM Research, Zurich Research Laboratory, CH-8803 Ruschlikon, Switzerland, IEEE 2001, 6 pp.
Bryant, C., "HGST Demos Ethernet as a Storage Drive Interface", tom's IT PRO, online <http://www.tomsitpro.com/articles/hgst-10gbps-ethernet-cloud-stor . . . >, 4 pp.
Swartz, K.L., "3PAR Fast RAID: High Performance Without Compromise", 2010, 3PAR Inc., 11 pp.
"Introduction to Toshiba Key Value Drive Technology", Toshiba Corporation, May 2015, 13 pp.
"Storage Monitoring for HDDs and RAID Controllers", Oracle Storage Monitoring and Zone Management, online <https://docs.oracle.com/cd/E19201-01/820-6410-12/ilom_storagemonitor . . . >, copyright 2010, accessed Jan. 11, 2016, 9 pp.
Armstrong, A., "Toshiba Announces Key Value-Based Technology for Object Storage", online <http://www.storagereview.com/toshiba_announces_key_valuebase . . . >, May 18, 2015, 2 pp.
"Whitepaper, Key Value Drive", Toshiba Corporation, May 2015, 10 pp.

\* cited by examiner

PEER-TO-PEER REDUNDANT ARRAY OF INDEPENDENT DISKS (RAID) LACKING A RAID CONTROLLER

BACKGROUND

Disk drives, such as magnetic hard disk drives and solid-state drives (SSDs), are used to store data within computing systems. Modern disk drives are generally reliable. However, they can and do fail. To prevent data loss, therefore, one common approach is to configure a number of such drives within a redundant array of independent disks (RAID). Typically within a RAID, a RAID controller configures the constituent drives into an array, and serves as a central point by which access to the data stored on the drives is achieved. In a RAID, the total amount of storage space available to store data is less than the total storage capacity of the disk drives as a whole, because, for instance, parity data is also stored on the drives so that if a drive fails, it can be replaced with a spare disk drive and the RAID reconstructed without loss of data.

SUMMARY

An example non-transitory computer-readable data storage medium stores computer-executable code executable by a spare programmable disk drive to perform a method. The method includes monitoring a programmable disk drive configured within a peer-to-peer redundant array of independent disks (RAID) including a number of other programmable disk drives. The peer-to-peer RAID lacks a RAID controller, and the spare programmable disk drive is not part of the RAID. The method includes, in response to determining that the programmable disk drive has failed, replacing the programmable disk drive within the RAID such that the spare programmable disk drive becomes part of the RAID, and reconstructing data on the programmable disk drive that has failed by communicating with the other programmable disk drives of the RAID.

An example method includes taking over for a failed programmable disk drive configured within a peer-to-peer RAID including a number of other programmable disk drives, by a spare programmable disk drive. The peer-to-peer RAID lacks a RAID controller. The method includes, for a data block of the failed programmable disk drive to be reconstructed by the spare programmable disk drive, sending a request to a first programmable disk drive of the other programmable disk drives, by the spare programmable disk drive. The method includes in response to the first programmable disk drive receiving the request, sending data relevant to reconstructing the data block from the first programmable disk drive to a next programmable disk drive of the other programmable disk drives.

The method includes performing, by each other programmable disk drive as a given other programmable disk drive, from the next programmable disk drive to a next-to-last programmable disk drive, the following. The given other programmable disk drive receives the data relevant to reconstructing the data block from an immediately prior programmable disk drive. The given other programmable disk drive performs an exclusive-or (XOR) logic operation in relation to the received data relevant to reconstructing the data block and additional data relevant to reconstructing the data block stored by the given other programmable disk drive, yielding XOR'ed data. The given other programmable disk drive sends the XOR'ed data, as the data relevant to reconstructing the data block, to the other programmable disk drive that is immediately subsequent to the given other programmable disk drive.

The method includes receiving, by the last programmable disk drive of the other programmable disk drives, the data relevant to reconstructing the data block from the next-to-last programmable disk drive. The method includes performing, by the last programmable disk drive, the XOR logic operation in relation to the received data relevant to reconstructing the data block and additional data relevant to reconstructing the data block stored by the last programmable disk drive, yielding the data block as reconstructed. The method includes sending the data block as reconstructed from the last programmable disk drive to the spare programmable disk drive. The method includes storing the data block as reconstructed by the spare programmable disk drive.

An example system includes a network, and a number of programmable disk drives to communicate with one another over the network and that are organized as a peer-to-peer RAID that lacks a RAID controller. The system includes a first spare programmable disk drive and a second spare programmable disk drive. Each of the first and second spare programmable disk drives is to monitor a particular programmable disk drive of the programmable disk drives. One of the first and second spare programmable disk drives is to replace the particular programmable disk drive within the RAID and is to reconstruct data on the particular programmable disk drive in a specified manner when the particular programmable disk drive has failed. In the specified manner, for a data block of the particular programmable disk drive to be reconstructed, each programmable disk drive other than the particular programmable disk drive receives just one piece of data and sends just one piece of data.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
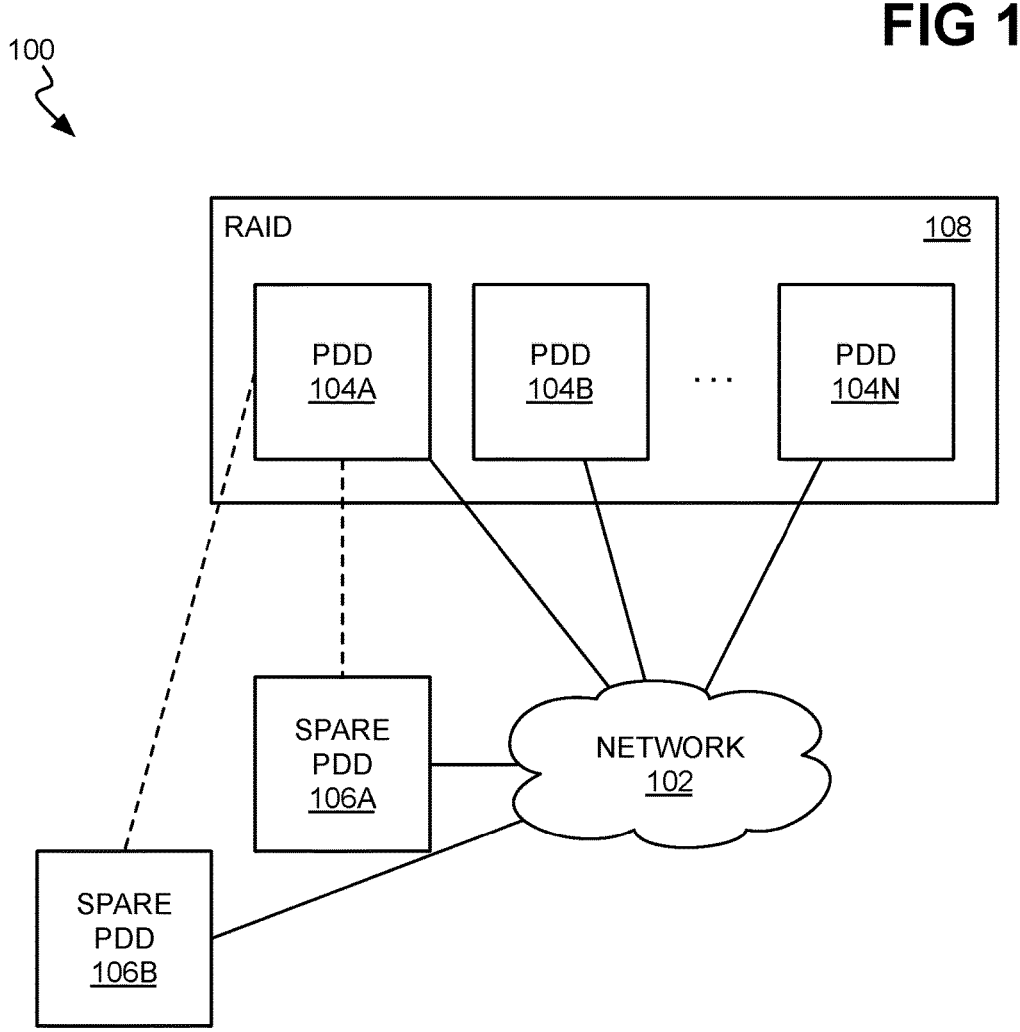
FIG. 1 is a diagram of an example system including a peer-to-peer redundant array of independent disks (RAID) of programmable disk drives (PDDs) that does not include a RAID controller.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, typically within a redundant array of independent disks (RAID), there is a RAID controller that is responsible for configuring the constituent disk drives into the RAID, and that is given both read and write access to the RAID. That is, the disk drives are not individually accessible other than by the RAID controller. Each of the disk drives of a conventional RAID is typically a "dumb" drive, without any processing capability other than an internal read/write controller to manage low-level access to the data stored on the physical storage medium of the drive. The interface connecting each such disk drive of the RAID to the central RAID controller may, for instance, be a serial AT attachment (SATA) interface.

A relatively new type of disk drive, however, is the programmable disk drive, which is also known as an Ethernet disk drive. A programmable disk drive typically eschews an interface like a SATA interface for just a wired Ethernet interface. A programmable disk drive generally includes a processor and a limited amount of memory, permitting the disk drive to have an operating system, such as a version of the LINUX operating system, installed thereon and run relatively small-scale applications. Programmable disk drives include those such as key value-based technology hard disk drives available from Toshiba Corp., of Tokyo, Japan, as well as open Ethernet hard disk drives available from HGST, Inc., a wholly owned subsidiary of Western Digital in San Jose, Calif.

A programmable disk drive differs from a network-attached storage (NAS) device, even such a NAS device that includes just one disk drive. A NAS device generally has a more capable processor and more memory than a programmable disk drive, and usually is able to run a variety of larger-scale applications, including providing a graphical user interface (GUI) by which the NAS device can be managed. While a NAS device is conceptually similar to a programmable disk drive, they are sufficiently different that they are not usually interchangeable, and those of ordinary skill within the art would not typically deploy one instead of the other for a particular usage scenario.

Disclosed herein are techniques that employ programmable disk drives to overcome a primary problem with a conventional RAID that uses a RAID controller. This problem is that the RAID controller serves as a non-redundant, single point of failure within a RAID, and further even in the event of no such failure, acts as a bottleneck of the RAID during normal usage. As to the former, if a RAID controller fails, the data stored on the disk drives of the RAID may become permanently lost. This is because the controller may use a proprietary scheme by which to store data among the disk drives of the RAID, and may not be able to be simply replaced by another RAID controller, even one from the same manufacturer.

As to the latter, during normal usage of the RAID, all read and write access to the data stored on the RAID traverses the RAID controller. If the controller is not sufficiently powerful, then access to the data can suffer from undesired latency, even if the interface between the controller and the client device(s) accessing the data is of sufficiently high bandwidth, and even if the interface between the controller and each disk drive of the RAID is likewise of sufficiently high bandwidth. Furthermore, if a disk drive of the RAID fails and is replaced by a spare disk drive, the controller is responsible for rebuilding the RAID. This process involves the controller flooding the interface between the controller and the surviving disk drives of the RAID with requests, and receiving responses in return, which is a process that can overburden even interfaces of the highest bandwidth.

The techniques disclosed herein thus leverage the programmable nature of programmable disk drives, such as Ethernet disk drives, to have a controller-less RAID. Rather, the RAID is a distributed, peer-to-peer RAID, in which no programmable disk drive thereof serves as the controller for the entire RAID, and in which there is no central RAID controller for the RAID. The problems associated with a RAID having a controller are removed, because there is no controller that acts as a single point of failure within the RAID, and there is no controller that acts as a bottleneck with respect to normal usage of the RAID. The techniques disclosed herein particularly provide for novel techniques to monitor the proper functioning of each programmable disk drive of such a RAID, and further for novel techniques to reconstruct the RAID when a programmable drive thereof does fail.

FIG. 1 shows an example system 100. The system 100 includes a network 102. For example, the network 102 can be an Ethernet network, such as a local-area network (LAN), an intranet, and so on. Programmable disk drives (PDDs) 104A, 104B, ..., 104N, collectively referred to as the programmable disk drives 104, are communicatively coupled to the network 102. Spare PDDs 106A and 106B, collectively referred to as the spare PDDs 106, are also communicatively coupled to the network 102. For example, each PDD 104 and 106 may have an Ethernet interface, such as including a physical RJ45 port, to permit the PDD to be connected to a corresponding Ethernet interface of a network device, like a switch or router, of the network 102.

The PDDs 104 are self-organized within a RAID 108. The RAID 108 is a distributed, peer-to-peer RAID because no PDD 104 has priority or is hierarchically over any other PDD 104. The RAID 108 also explicitly lacks a RAID controller that serves as a master controller for configuring and governing access to the RAID 108. For example, each PDD 104 may run RAID software by which a user, like an administrator, can specify the number of PDDs 104 in the RAID 108, the type of the RAID 108 (RAID4, RAID5, RAID6, and so on), and the identity of each other PDD 104 in the RAID 108.

When a request to read or write data from or to the RAID 108 is sent by a client device over the network 102, each PDD 104 of the RAID 108 receives the request. Each PDD 104 has knowledge of which data it is responsible for storing, if any, as well as of which parity information it is responsible for storing, if any. A PDD 104 may store just data, just parity information, or both data and parity information. When a read request is received, just the PDD 104 storing the data that is the subject of the request may respond to the request with the requested data. When a write request is received, the PDD 104 storing the data that is the subject of the request stores the data, and the (same or different) PDD 104 storing the parity information for the data updates the parity information after potentially requesting other PDD(s) 104 to provide it with related data necessary to update the parity information.

Each PDD 104 has at least one spare PDD monitoring it, and desirably more than one spare PDD. The spare PDDs are not part of the RAID 108 itself initially. Explicitly depicted in FIG. 1 are two spare PDDs 106 monitoring the PDD 104A. Each spare PDD 106 may monitor other PDDs of the same RAID 108 or a different RAID as well. In this latter respect, the ability for a given spare PDD to monitor multiple PDDs of multiple RAIDs provides for thin provisioning that permits a substantially smaller number of spare PDDs to be kept online for such monitoring purposes as compared to as in conventional RAID, in which usually each spare PDD can only monitor one (or more) PDDs of a single RAID.

For the example of FIG. 1, with respect to the two spare PDDs 106 monitoring the PDD 104A, one of the spare PDDs 106 has higher priority than the other spare PDD 106 in replacing the PDD 104A within the RAID 108 in case of failure. Both spare PDDs 106 monitor the PDD 104A for failure (along with any other PDDs of the same or different RAID for which the PDDs 106 are responsible, where each spare PDD 106 may be responsible for monitoring a different set of PDDs). However, when the PDD 104A has failed, the higher priority spare PDD 106 has priority in replacing the PDD 104A within the RAID 108 as compared to the lower priority PDD 106.

Figure 2:
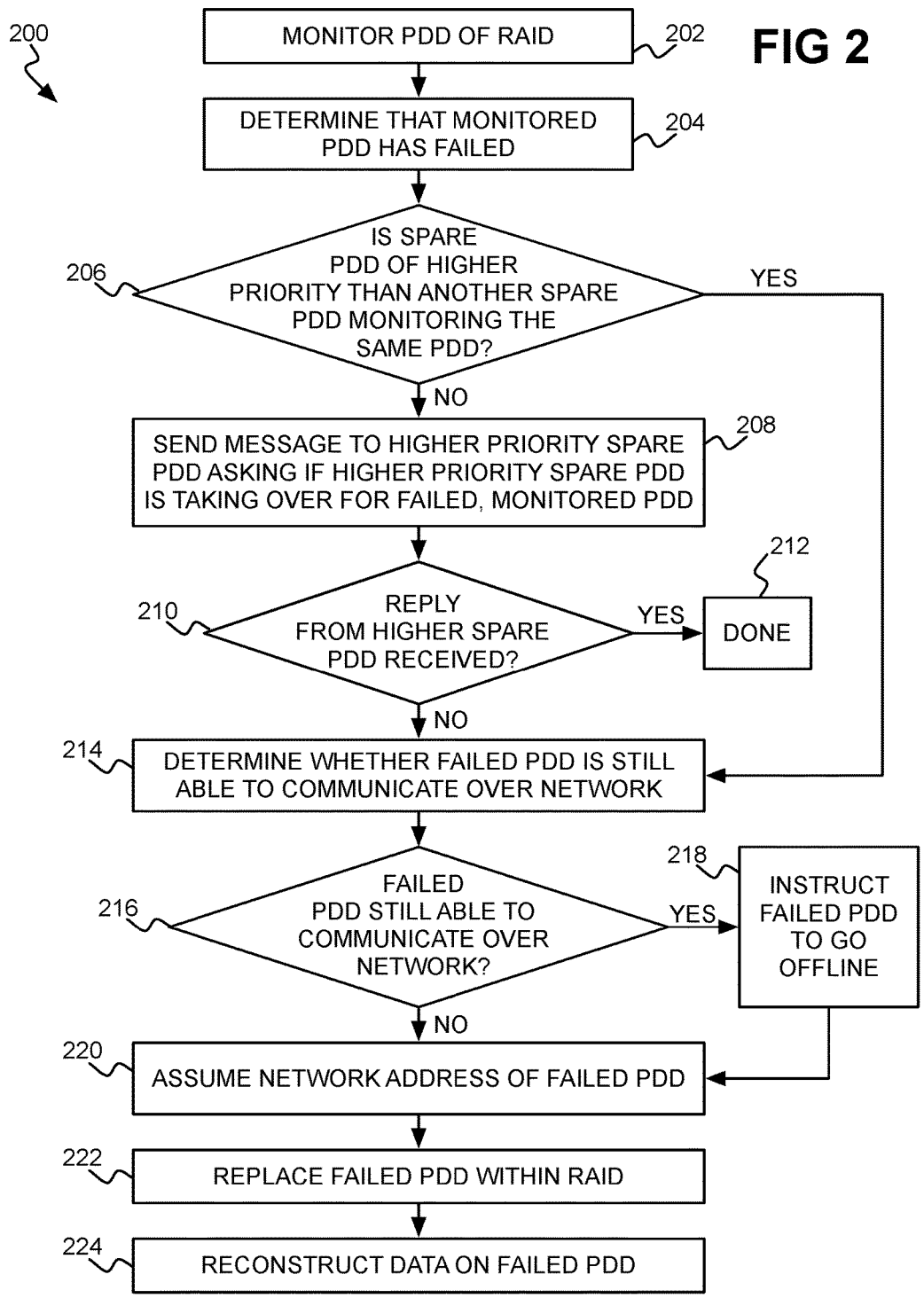
FIG. 2 is a flowchart of an example method that a spare PDD for a peer-to-peer RAID lacking a RAID controller can perform.

In this respect, FIG. 2 shows an example method 200 performed by each spare PDD 106 as to the PDD 104A of the RAID 108 in particular. The method 200 may be performed by a processor of a spare PDD 106 executing computer-executable code stored on a non-transitory computer-readable data storage medium, such as a memory, of the spare PDD 106. For example, the spare PDD 106 may be running an operating system, and the computer-executable code may be a RAID application running on top of the operating system. The method 200 is described with respect to "a spare PDD 106," but as noted is performed by each spare PDD 106.

A spare PDD 106 monitors the PDD 104A of the RAID 108 (202) to determine whether the PDD 104A is operating properly or has failed (204). Such monitoring may be performed synchronously or asynchronously, at the initiation of the spare PDD 106, the PDD 104A, or both. For example, the spare PDD 106 may periodically send a request to the PDD 104A asking the PDD 104A if it is operating properly within the RAID 108. The PDD 104A may respond that it has failed—e.g., at least a portion of its physical storage medium is no longer operating properly—may respond that it is operating properly, or may not respond at all. If a threshold number of lack of responses occurs in a row or within a given time frame, the spare PDD 106 also concludes that the PDD 104A has failed.

As another example, the spare PDD 106 may expect that the PDD 104A periodically report its operational status. The PDD 104 may report that it has failed or that it is operating properly, or may fail to report. If a threshold number of reporting failures occur in a row or within a given time frame, the spare PDD 106 also concludes that the PDD 104A has failed. The threshold number as described in this paragraph and in the preceding paragraph may be as little as one.

Once the spare PDD 106 has determined that the PDD 104A has failed (204), either due to the PDD 104A indicating such failure or due to the PDD 104A failing to communicate with the spare PDD 106 the threshold number of times, if the spare PDD 106 is a lower priority spare PDD 106 responsible for the PDD 104A (206), then the spare PDD 106 performs the following. The spare PDD 106 sends a message to the higher priority spare PDD 106 also responsible for the PDD 104A, asking if this higher priority spare PDD 106 will be taking over the failed PDD 104A (208). If a reply is received from the higher priority spare PDD 106 indicating that the higher priority spare PDD 106 is taking over for the failed PDD 104A (210), then the method 200 is finished with respect to the lower priority spare PDD 106 (212). This is because the higher priority spare PDD 106 is taking over for the failed PDD 104A within the RAID 108, and therefore the lower priority spare PDD 106 performing the method 200 does not have to.

However, if a reply from the higher priority spare PDD 106 indicating that it is taking over the failed PDD 104A is not received by the PDD 106 performing the method 200 (210), or if the PDD 106 performing the method 200 is the higher priority spare PDD 106 (212), then the spare PDD 106 in question performs the following. The spare PDD 106 may determine whether the failed PDD 104A is still able to communicate over the network 102 (214). For example, if the spare PDD 106 received a reply or a report in part 202 from the PDD 104A indicating that the PDD 104A has failed, then this means that the PDD 104A can still communicate over the network 102. By comparison, if the spare PDD 106 concluded that the PDD 104A has failed due to the PDD 104A failing to reply or report the threshold number of times, then this means that the PDD 104A cannot still communicate over the network 102.

If the failed PDD 104A can still communicate over the network 102 (216), then the spare PDD 106 instructs the failed PDD 104A to go offline (218), by sending the failed PDD 104A a message over the network 102 to do so. By going offline, the failed PDD 104A is no longer logically connected to the network 102, and its network address, such as an Internet protocol (IP) address, is automatically relinquished. Similarly, if the failed PDD 104A already is not able to communicate over the network 102, then the PDD 104A has effectively relinquished its network address for the network 102.

Therefore, either if the failed PDD 104A is not able to communicate over the network 102 (216), or if it is, and after the spare PDD 106 has instructed the failed PDD 104A to go offline (218), then the spare PDD 106 assumes the network address of the failed PDD 104A (220). Assumption of the network address of the failed PDD 104A permits the spare PDD 106 to take the place of the failed PDD 104A without necessarily having to reconfigure or even inform the other, surviving PDDs 104 of the RAID 108, if the PDDs 104 of the RAID 108 have knowledge of one another via their network addresses. The spare PDD 106 thus replaces the failed PDD 104A within the RAID 108 such that the spare PDD 106 becomes part of the RAID 108 (222), and reconstructs the data on the failed PDD 104A (224) by communicating with the other, surviving PDDs 104 of the RAID 108.

Figure 3:
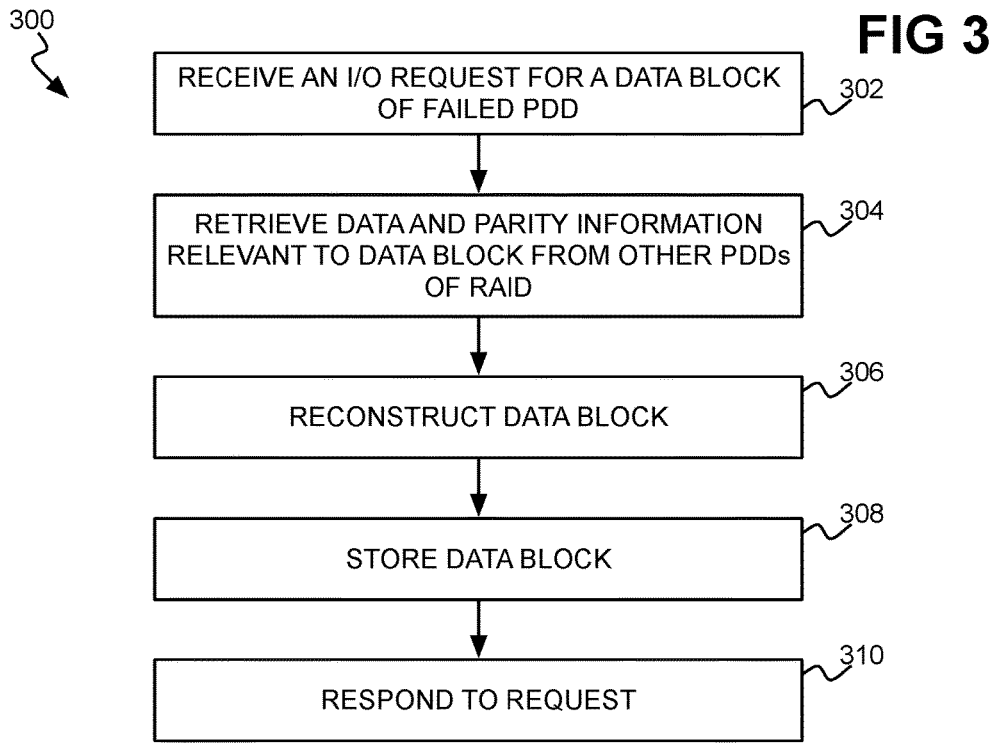
FIG. 3 is a flowchart of an example method that a spare PDD for a peer-to-peer RAID lacking a RAID controller can perform after taking over for a failed PDD of the RAID, responsive to receiving an input/output (I/O) request for a data block for which the spare PDD is responsible.
Figure 4:
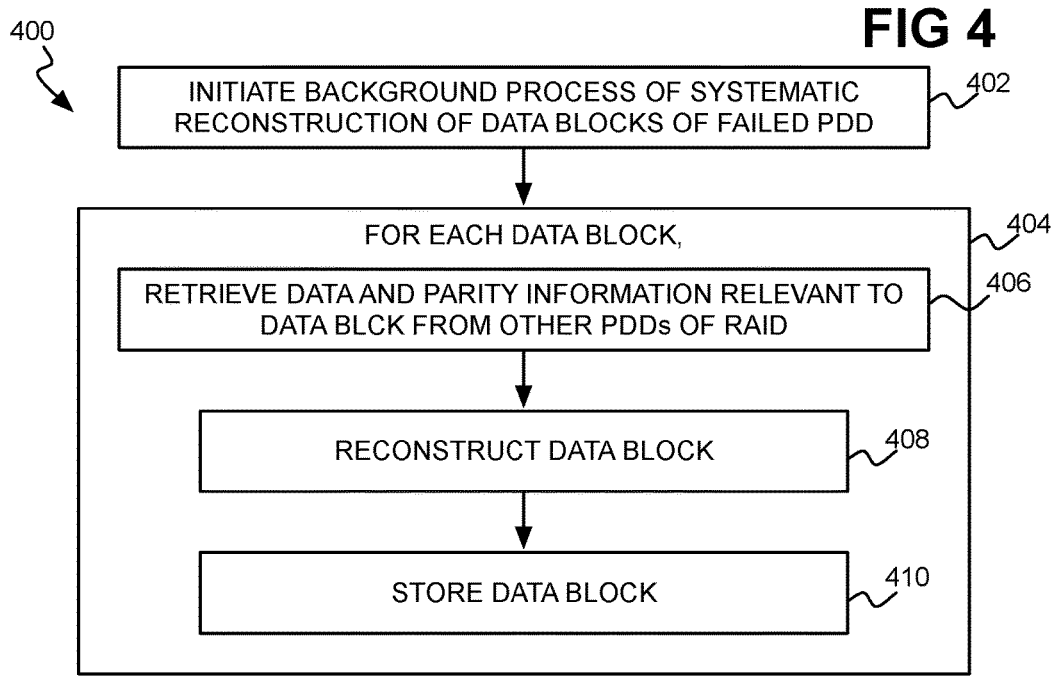
FIG. 4 is a flowchart of an example method that a spare PDD for a peer-to-peer RAID lacking a RAID controller can perform after taking over for a failed PDD of the RAID, to systematically reconstruct the data blocks of the failed PDD.

FIGS. 3 and 4 show example methods 300 and 400 of general approaches that a spare PDD 106 that has taken over for the failed PDD 104A within the RAID 108 in part 222 of the method 200 can employ to reconstruct the data on the failed PDD 104A in part 224. As with the method 200, the methods 300 and 400 can be implemented as computer-executable code that a processor of the spare PDD 106 performs. The method 300 is performed on an as-needed basis, whereas the method 400 is performed on a systematic basis, in the background.

In FIG. 3, the spare PDD 106, along with the surviving PDDs 104 of the RAID 108, receive an I/O request for a data block for which the failed PDD 104 was responsible, and thus for which the spare PDD 106 is now responsible (302). Because the spare PDD 106 is now responsible for this data block, the spare PDD 106 is the PDD that responds to the request. The method 300 presumes that the spare PDD 106 has not yet reconstructed the data block in question.

The spare PDD 106 retrieves data and parity information relevant to the data block from the other, surviving PDDs 104 of the RAID 108 (304). For instance, the spare PDD 106 may request that each surviving PDD 104 send the spare PDD 106 the data or parity information relevant to the data block. Within a RAID 108, a data block can be reconstructed by retrieving data blocks of the same stripe, or code block, as the data block in question, as well as by retrieving parity information of the same stripe or code block. Each surviving PDD 104 may store a data block of this stripe or code block, or parity information for this stripe or code block.

To reconstruct the requested data block (306), the spare PDD 106 therefore may perform an exclusive-or (XOR) logic operation on the data blocks and parity information received from the other, surviving PDDs 104. The result of the XOR logic operation is the data block in question. Once the requested data block has been reconstructed, the spare PDD 106 stores the data block (308), such as at the same position on its physical storage medium as the failed PDD 104 had stored the data block on its physical storage medium. The spare PDD 106 then responds to the I/O request by returning the requested data block (310).

In FIG. 4, the spare PDD 106 initiates a background process to systematically reconstruct the data blocks of the failed PDD 104 (402). This process is not performed responsive to any I/O request for a particular data block, and is instead systematically performed in the background so that at some point, the spare PDD 106 will have completely reconstructed the data blocks of the failed PDD 104. While the spare PDD 106 is performing the method 400, as I/O requests for data blocks arrive at the RAID 108 that are the responsibility of the spare PDD 106, if the requested data blocks have not yet already been reconstructed, the spare PDD 106 may in parallel with the background process perform the method 300, or may temporary suspend the background process to perform the method 300.

Therefore, for each data block of the failed PDD 104 to be reconstructed (404), the spare PDD 106 retrieves the data and parity information relevant to the data block from the other, surviving PDDs 104 of the RAID 108 (406), as in part 304. Similarly, the spare PDD 106 then reconstructs the data block from the received data and parity information (408), as in part 306. Finally, the spare PDD 106 stores the reconstructed data block (410), as such as the same position on its physical storage medium as the failed PDD 106 had stored the data block on its physical storage medium, as in part 308.

Figure 5:
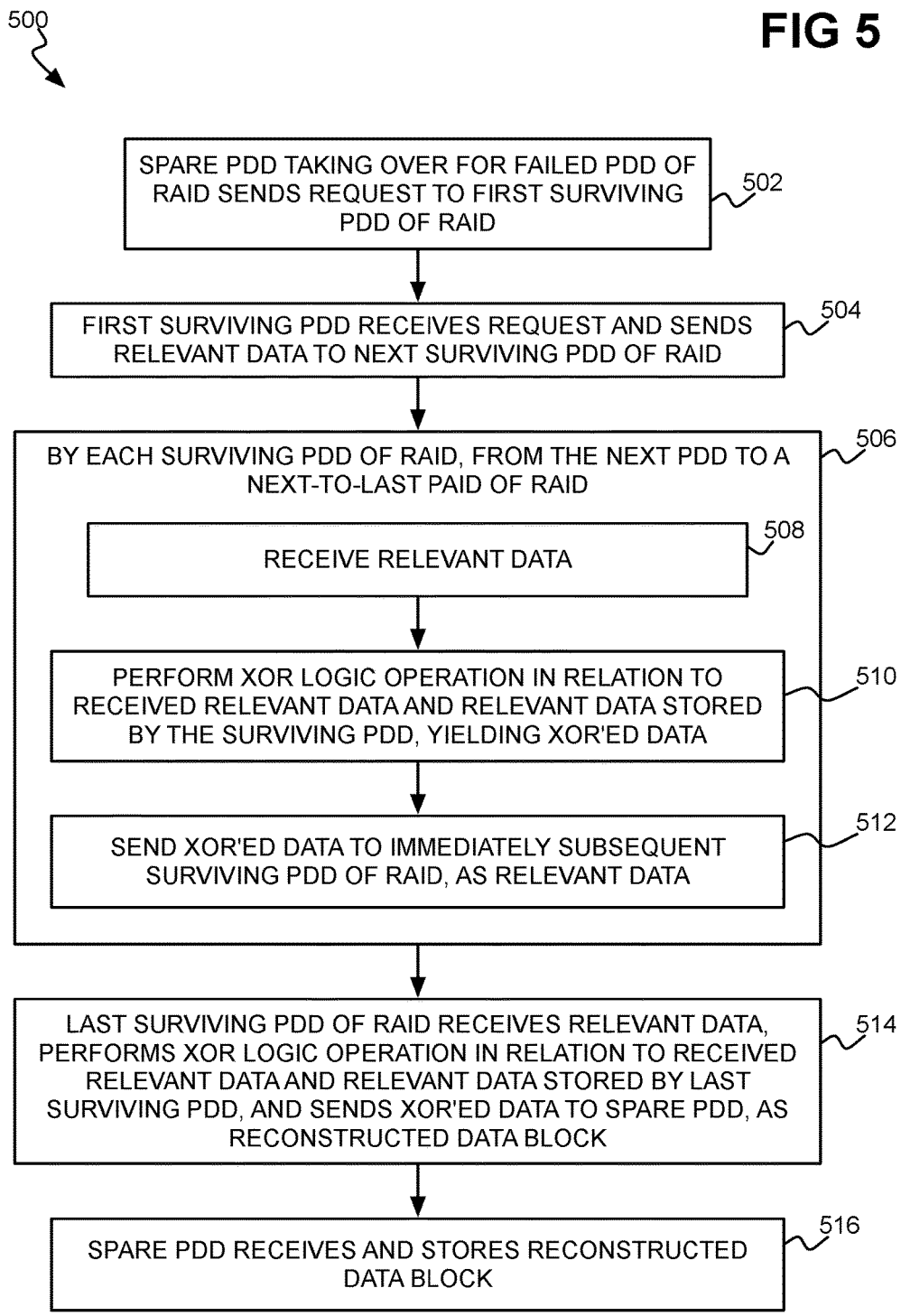
FIG. 5 is a flowchart of an example method for reconstructing a data block of a failed PDD within a peer-to-peer RAID lacking a RAID controller, in a bandwidth-efficient manner.

In lieu of performing parts 304, 306, and 308 of the method 300 or part 404 of the method 400, the spare PDD 106 may instead perform a different type of process to reconstruct a data block of the failed PDD 104 that is more bandwidth efficient. FIG. 5 shows an example method 500 for more bandwidth-efficient data block reconstruction in this respect. The method 500 is performed by the spare PDD 106 that has taken over for the failed PDD 104, in conjunction with the other, surviving PDDs 104 of the RAID 108. The method 500 can be implemented in the same manners as the other methods that have been described, as computer-executable code stored on a non-transitory computer-readable data storage medium of each PDD 104 and 106 that a processor thereof executes.

In the method 500, the surviving PDD 104 of the RAID 108 are ordered from the first surviving PDD 104 to the last surviving 108. The particular order does not matter, however. The spare PDD 106 taking over for the failed PDD 104 of the RAID 108 sends a request regarding the data block to be reconstructed to the first surviving PDD 104 of the RAID 108 (502). The first surviving PDD 104 receives the request, and in response sends the data relevant to this data block to the next surviving PDD 104 of the RAID 108 within the order (504). The data relevant to the data block can be another data block of the same stripe or code block, or parity information for the same stripe or code block.

The following is then performed by each other surviving PDD 104, from the next surviving PDD 104 to which the first surviving PDD 104 sent its relevant data, to the next-to-last surviving PDD 104 within the order (506). The surviving PDD 104 receives the relevant data from the immediately prior surviving PDD 104 within the order (508). This surviving PDD 104 then performs an XOR logic operation in relation to the received relevant data and the relevant data that this surviving PDD 104 itself stored (which can be a data block or parity information for the same stripe or code block as the data block to be reconstructed), yielding XOR'ed data (510). The surviving PDD 104 sends the XOR'ed, as the relevant data to reconstructing the data block in question, to the surviving PDD 104 that is immediately subsequent to the surviving PDD 104 within the order (512).

As such, if the immediately subsequent PDD 104 to which the XOR'ed data was sent in part 512 is not the last PDD 104 within the order—or, stated another way, the XOR'ed data was not sent by the next-to-last PDD 104 within the order—then part 506 is performed by the immediately subsequent PDD 104. This continues until the immediately subsequent PDD 104 to which the XOR'ed data was sent in part 512 is the last PDD 104 within the order (i.e., the XOR'ed data was sent by the next-to-last PDD 104). Once the XOR'ed data is sent in part 512 to the last PDD 104, the last surviving PDD 104 of the RAID 108 receives this relevant data, performs an XOR logic operation in relation to this relevant data and the relevant data that the last PDD 104 itself stores (which can be a data block or parity information for the same stripe or code block), and sends the XOR'ed data to the spare PDD 106 (514).

The XOR'ed data sent by the last surviving PDD 104 within the order to the spare PDD 106 is the reconstructed data block. Therefore, the spare PDD 106 receives the reconstructed data block and stores it (516), such as again at the same position at which the failed PDD 104 stored the data block. The method 500 is advantageous because it reduces bandwidth on a per-PDD 104 and 106 basis for data block reconstruction.

Specifically, for a given data block to be reconstructed, each surviving PDD 104 receives just one piece of data and sends just one piece of data. The piece of data sent is the data relevant to reconstructing the data block, either XOR'ed data in the case of every PDD 104 except the first PDD 104 in the order, or a data block or parity information in the case of the first PDD 104. The piece of data received is the data relevant to reconstructing the data block in the case of every PDD 104 except the first PDD 104 in the order, and is more specifically a data block or parity information in the case of the PDD 104 immediately subsequent to the first PDD 104, and is XOR'ed data for every other such PDD 104. The piece of data received in the case of the first PDD 104 is the request from the spare PDD 106. The spare PDD 106 itself also receives and sends just one piece of data: the piece of data sent is the request sent to the first PDD 104 in the order, and the piece of data received is the reconstructed data block of interest received from the last PDD 104 in the order. In general, but for the original request sent by the spare PDD 106 initially, the size of each piece of data sent and received by each PDD 104 or 106 is typically the same size as the size of the data block being reconstructed.

As a concrete example of the method 500, assume that there are four PDDs 104 of the RAID 108, and that the spare PDD 106A has taken over for a failed PDD 104. The three surviving PDDs 104 of the RAID 108 may be the PDDs 104A, 104B, and 104N, in that order. The spare PDD 106A sends a request to the PDD 104A in part 502, which receives the request and sends its relevant data to the PDD 104B in part 504. The PDD 104B is the only PDD 104 in this example for which part 506 (and thus parts 508, 510, and 512) is performed. The PDD 104N receives the relevant data, which is XOR'ed data, from the PDD 104B, performs an XOR logic operation as to this XOR'ed data and its own relevant data, and sends the XOR'ed data to the spare PDD 106A in part 514. This XOR'ed data is the reconstructed data block, which the spare PDD 106A receives and stores in part 516.

Figure 6:
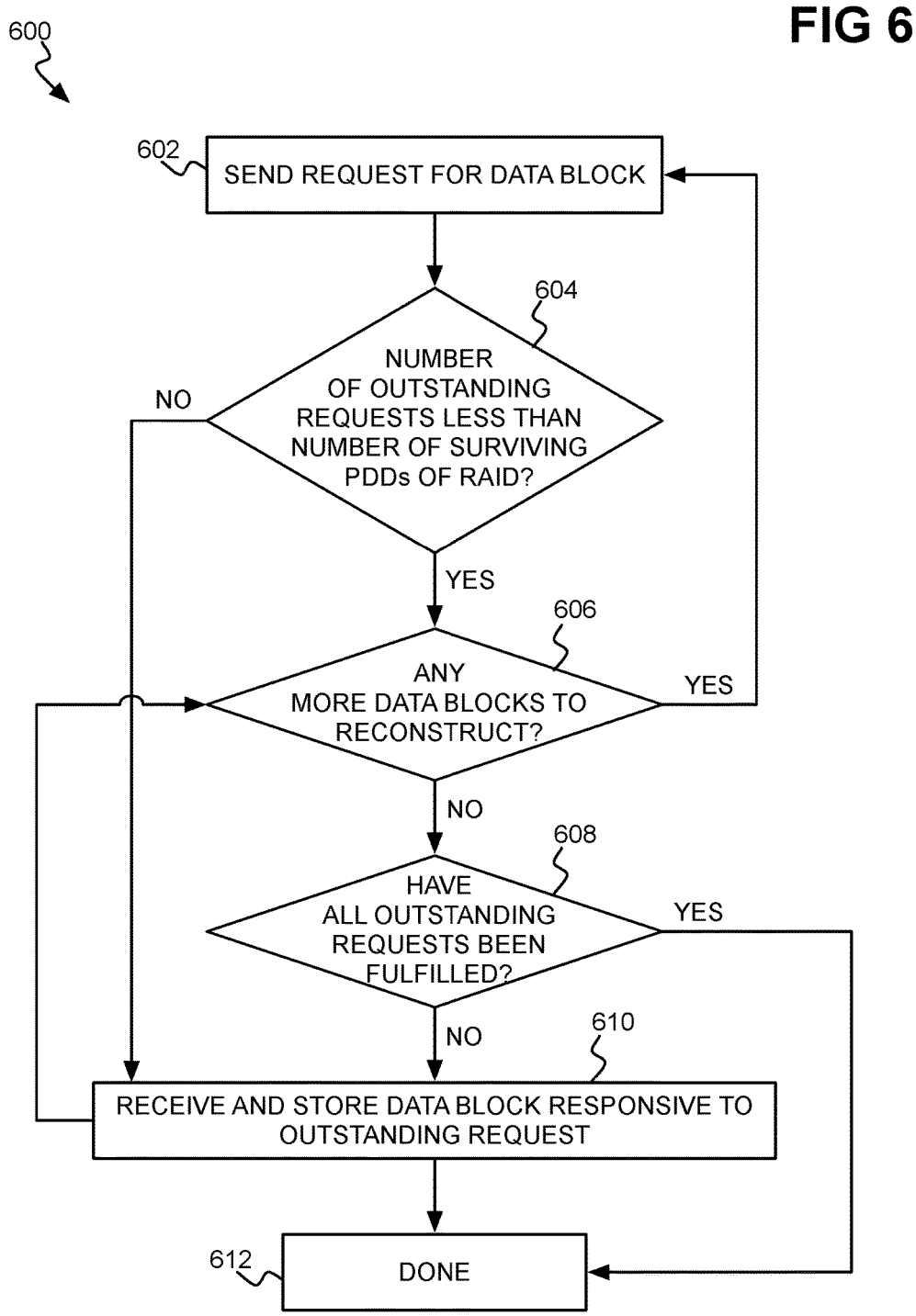
FIG. 6 is a flowchart of an example method that a spare PDD for a peer-to-peer RAID lacking a RAID controller can perform when taking over for a failed PDD of the RAID, to reconstruct the data blocks of the failed PDD in a bandwidth-efficient manner.

The method 500 can be performed on a one-off basis in lieu of parts 304, 306, 308, and 310 of the method 300 when the spare PDD 106 in question receives an I/O request for a data block that it has not yet reconstructed in part 302 of the method 300. The method 500 can also be performed for each data block in part 404, on a data block-by-data block basis, as the background process initiated in part 402 of the method 400, in lieu of parts 406, 408, and 410 being performed for each data block in part 404. FIG. 6 shows an example method 600 by which such the spare PDD 106 can manage the process of reconstructing the data blocks of the failed PDD 104, with respect to when to send out a request for another data block to be reconstructed and when not to. Like the other methods, the method 600 can be implemented as computer-executable code stored on a non-transitory data storage medium of the spare PDD 106 and executed by a processor of the spare PDD 106.

The method 600 may begin by the spare PDD 106 sending a request for a data block (602), such that the method 500 is effectively initiated; that is, part 602 can be the request sending of part 502 of the method 500. The spare PDD 106 may proceed through all the data blocks of the failed PDD 104 in order, on a data block-by-data block basis, as part of a systematic background reconstruction process. However, when an I/O request is received for a particular data block for which the spare PDD 106 is responsible and that has not yet been reconstructed, this data block may be sent "to the front of the line," such that the next request sent by the spare PDD 106 is for this data block. Once a request has been sent, it is considered as being an outstanding request until the spare PDD 106 has received the data block to which the request pertains. At that time, the request is no longer outstanding, but has been fulfilled.

If the number of outstanding requests is less than the number of surviving PDDs 104 of the RAID 108 (604), and if there are any more data blocks that the spare PDD 106 has to reconstruct (606), then the spare PDD 106 immediately sends another request for a data block in part 602. The number of surviving PDDs 104 can be the number of PDDs 104 within the RAID 108, not including the spare PDD 106 that has taken over for the failed PDD 104 of the RAID 108, minus one, which corresponds to the failed PDD 104. Once the number of outstanding requests is equal to the number of surviving PDDs 104 (604), however, the spare PDD 106 does not immediately send another request for a data block. Rather, the spare PDD 106 waits until it receives a reconstructed data block responsive to one of the outstanding requests, and stores this reconstructed data block (610), which corresponds to part 516 of the method 500.

After the spare PDD 106 has received a reconstructed data block responsive to one of the outstanding requests, this means that the number of outstanding requests is less than the number of surviving PDDs 104, since at any given time, the number of outstanding requests is not higher than the number of surviving PDDs 104. Therefore, the spare PDD 106 proceeds from part 610 back to part 606. At some point, there will be no more data blocks to reconstruct (606). If there are still outstanding requests that have not yet been fulfilled (608), the spare PDD 106 repeats parts 610, 606, and 608 until all outstanding requests have been fulfilled. The method 600 is then completed (612).

Figure 7:
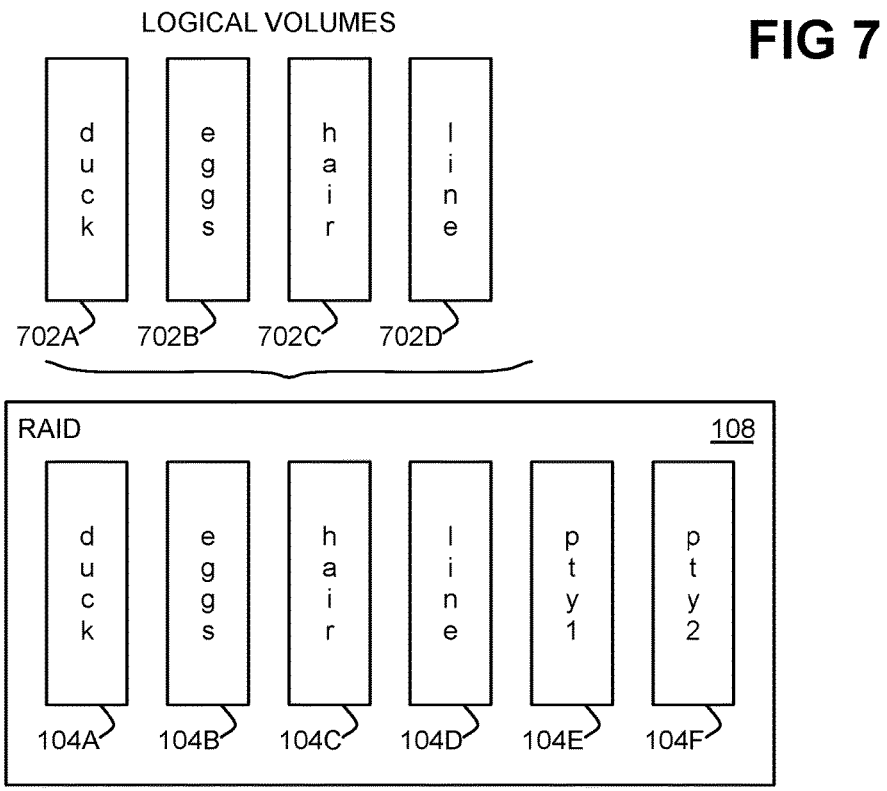
FIG. 7 is a diagram of an example topology of a specific manner by which data blocks and parity information are stored over PDDs of a peer-to-peer RAID lacking a RAID controller and on which one or more logical volumes are defined.

FIG. 7 shows an example topology 700 illustrating a specific manner by which the data blocks and the parity information are stored over the PDDs 104 of the RAID 108. In the example of FIG. 7, there are six PDDs 104: PDD 104A, PDD 104B, PDD 104C, PDD 104D, PDD 104E, and PDD 104F. For sake of example, four logical (not physical) volumes 702A, 702B, 702C, and 702D, collectively referred to as the logical volumes 702, are stored on the RAID 108.

In the topology 700, all the data blocks of a given logical volume 702 are stored on just one corresponding (physical) PDD 104. The data blocks d, u, c, k of the volume 702A are stored on the PDD 104A; the data blocks e, g, g, s of the volume 702B are stored on the PDD 104B; the data blocks h, a, i, r of the volume 702C are stored on the PDD 104C; and the data blocks l, i, n, e of the volume 702D are stored on the PDD 104D. The remaining two PDDs 104E and 104F store the parity information for the RAID 108.

The topology 700 thus differs from a conventional RAID topology, in which typically the data blocks and the parity information of a RAID are striped across code blocks of the physical storage devices. That is, in a conventional RAID topology, there is no correspondence between the data blocks of a logical volume and a single physical storage device on which those data blocks are exclusively stored. Parity information within a conventional RAID topology may likewise be stored across the physical storage devices, instead of being exclusively stored by one or more physical storage devices of the RAID.

The topology 700 is advantageous in the context of the peer-to-peer RAID 108 that lacks a RAID controller and that is made up of PDDs 104. This is because the PDDs 104 each have an operating system, and thus can run limited applications at the closest level to where data is stored. As has been described above, such applications can be distributed, such as to implement the peer-to-peer RAID 108. However, other applications may not be distributed, and instead pertain to just the data of a given logical volume. As a straightforward example, a given logical volume may store surveillance video data. Face detection of this surveillance video is data intensive, in that each frame of the video may have to be inspected. Rather than having such face detection performed by a client device that retrieves data from the RAID 108, the PDD 104 storing the data blocks of the logical volume in question may instead perform the face detection. As such, the data does not have to be sent over the network 102, which is a typically slower process than a PDD 104 accessing the data stored on its own physical storage medium.

In general, then, the example of FIG. 7 depicts a scenario in which each logical volume 702 includes a different portion of the data blocks of the RAID 108. Further, the data blocks of each logical volume 702 are stored completely, if at all possible, on just one PDD 104. A given PDD 104 may store more all the data block of more than one logical volume 702. If a given logical volume 702 is greater in size than the storage capacity of each PDD 104, the data blocks thereof may be stored on the smallest number of the PDDs 104. That is, if the size of a logical volume 702 is X, and the storage space of each PDD 104 is Y<X, then the smallest number of PDDs 104 needed to store the logical volume 702 is X/Y, rounded up. The parity information of the RAID 108 may also be stored on one or more PDDs 104 that store just parity information.

Figure 8:
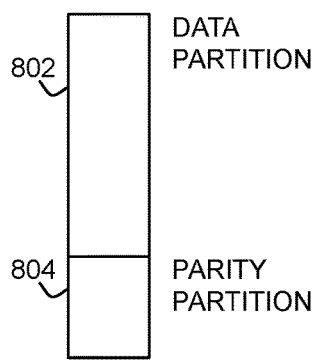
FIG. 8 is a diagram of an example topology of a specific manner by which data blocks and parity information are stored on each PDD of a peer-to-peer RAID lacking a RAID controller.

FIG. 8 shows another example topology 800 illustrating a specific manner by which the data blocks and the parity information are stored over each PDD 104. A single representative PDD 104 is depicted in FIG. 8. The PDD 104 has two partitions: a data partition 802, and a parity partition 804. The data partition 802 stores just data blocks, whereas the parity partition 804 stores just parity information. In the example of FIG. 8, the data partition 802 is located at the beginning of the physical storage medium of the PDD 104 and the parity partition is located at the end, although in another implementation this can be reversed.

Storing all the parity information in a physically separate partition than the data blocks on each PDD 104 can be advantageous. Within the RAID 108, parity information and data blocks can be striped across the PDDs 104 for each code block. However, a PDD 104, as a programmable drive, has a built-in file system, particularly since it runs an operating system. A PDD 104 further can perform processing on the data stored on its own physical storage medium, as noted above in relation to the topology 700. This means that if the parity information and data blocks are interspersed within the same partition of the PDD 104, the file system has to be aware of which data are data blocks and of which data are parity information, because overwriting parity information can result in the RAID 108 not being able to sustain the failure of a PDD 104 if the overwritten parity information is required to reconstruct the failed PDD 104.

Having the file system maintain the locations of the parity information can result in a lot of processing overhead, slowing the performance of the PDD 104 in question. Furthermore, data is written to the physical storage medium of a PDD 104 most quickly when it can be written over contiguous locations of the medium. If a particular location has to be skipped, writing speed can suffer. Thus, even if the file system maintains the locations of the parity information, performance can worsen.

These problems are mitigated by maintaining two physically separate partitions on the physical storage medium of each PDD 104 of the RAID 108. When data is written to the data partition 802, there is no concern that any location thereof contains parity information and thus has to be skipped. Likewise, the file system of the PDD 104 does not have to maintain a list of the locations at which parity information is stored, since the parity information is stored in a completely separate partition 804. For both of these reasons, performance of the PDD 104 is not degraded.

Figure 9:
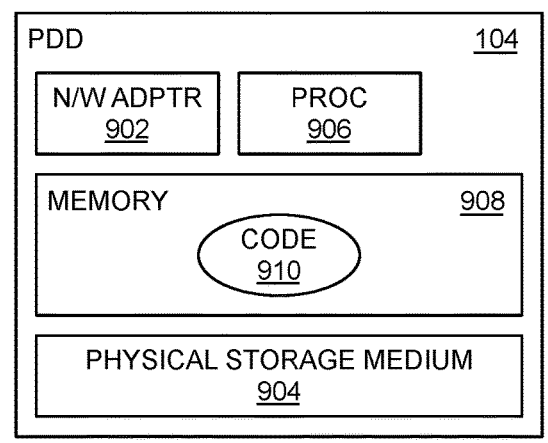
FIG. 9 is a diagram of an example PDD.

FIG. 9 shows an example and representative PDD 104 that can implement the peer-to-peer RAID 108 lacking a RAID controller that has been described herein. The PDD 104 includes a network adapter 902, which may be a wired Ethernet interface, for instance. The network adapter 902 permits the PDD 104 to communicate over the network 102 to participate in the RAID 108. In some implementations, the network adapter 902 may be the sole external interface of the PDD 104. For example, the PDD 104 may lack a SATA interface or other type of interface that is commonly found in "dumb" disk drives to interface with a bus of a host computing device. That is, the PDD 104 may lack any type of external interface by which to connect directly to a bus of a host computing device. In this respect, too, the PDD 104 differs from a conventional NAS, which generally includes therein one or more separate "dumb" disk drives that are connected to a bus, such as a SATA bus, via a corresponding interface.

The PDD 104 also includes a physical storage medium 904, which is the non-volatile medium that stores the data blocks and/or parity information of the RAID 108 for which the PDD 104 is responsible. The physical storage medium 904 may be a magnetic medium, such as one or more hard disk drive platters, or it may be a semiconductor memory, such as a number of semiconductor integrated circuits (ICs) of the type found in a solid-state drive (SSD). However, the physical storage medium 904 is not a complete hard disk drive or SSD in and of itself. In this respect, the PDD 104 may include a read/write controller associated with the physical storage medium 904, although for illustrative convenience such a controller is not depicted in FIG. 9.

The PDD 104 also includes a processor 906 and a memory 908, such as a volatile semiconductor memory like dynamic random-access memory (DRAM), storing computer-executable code 910. The processor 906 is typically a general-purpose processor, of the type commonly found in computing devices like desktop and laptop computers, but may be less powerful than those found in such computing devices. Likewise, the memory 908 is not cache memory, or does not serve just to perform caching, but rather is similar to memory found in computing devices like desktop and laptop computers, in that it can store the computer-executable code 910.

The processor 906, the memory 908, and the computer-executable code 910 together are what imbue the PDD 104 with its programmable nature. The code 910 generally includes an operating system, and at least one application program running thereon. One application program may provide the PDD 104 with the ability to participate along with the other PDDs 104 in the distributed peer-to-peer RAID 108 lacking a RAID controller. Another application program may permit the PDD 104 to perform local processing on the data stored on the physical storage medium 904, as described above in relation to FIG. 7.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A non-transitory computer-readable data storage medium storing computer-executable code executable by a spare programmable disk drive to perform a method comprising:
   monitoring a programmable disk drive configured within a peer-to-peer redundant array of independent disks (RAID) including a plurality of other programmable disk drives, the peer-to-peer RAID lacking a RAID controller, the spare programmable disk drive not part of the RAID;
   in response to determining that the programmable disk drive has failed:
      replacing the programmable disk drive within the RAID such that the spare programmable disk drive becomes part of the RAID; and
      reconstructing data on the programmable disk drive that has failed by communicating with the other programmable disk drives of the RAID, wherein the spare programmable disk drive is a first spare programmable disk drive monitoring the programmable disk drive, the programmable disk drive having a second spare programmable disk drive also monitoring the programmable disk drive, wherein the second spare programmable disk drive has a different priority than the first spare programmable disk drive with respect to replacing the programmable disk drive.

2. The non-transitory computer-readable data storage medium of claim 1, wherein the second spare programmable disk drive has lower priority than the first spare programmable disk drive with respect to replacing the programmable disk drive.

3. The non-transitory computer-readable data storage medium of claim 1, wherein second spare programmable disk drive has higher priority than the first spare programmable disk drive with respect to replacing the programmable disk drive, the method further comprising, in response to determining that the programmable disk drive has failed and prior to the first spare programmable disk drive replacing the programmable disk drive within the RAID:
   sending a message to the second spare programmable disk drive asking the second spare programmable disk drive whether the second spare programmable disk drive is replacing the programmable disk drive within the RAID;
   in response to the first spare programmable disk drive failing to receive a reply from the second spare programmable disk drive indicating that the second spare programmable disk drive is replacing the programmable disk drive within the RAID, proceeding to replace the programmable disk drive within the RAID by the first spare programmable disk drive; and
   in response to the first spare programmable disk drive receiving the reply from the second spare programmable disk drive indicating that the second spare programmable disk drive is replacing the programmable disk drive within the RAID, not replacing the programmable disk drive within the RAID by the first spare programmable disk drive.

4. The non-transitory computer-readable data storage medium of claim 1, wherein reconstructing the data on the programmable disk drive that has failed comprises:
   in response to receiving an input/output (I/O) request for a particular data block of the programmable disk drive that has failed:
      retrieving data and parity information relevant to the particular data block from the other programmable disk drives of the RAID;
      reconstructing the particular data block from the data and the priority information;
      storing the particular data block at a position on the spare programmable disk drive identical to a position on the programmable disk drive that has failed on which the particular data block was stored; and
      responding to the request with the particular data block.

5. The non-transitory computer-readable data storage medium of claim 4, wherein reconstructing the data on the programmable disk drive that has failed further comprises:
   initiating a background process of systematically reconstructing each data block of a plurality of data blocks of the programmable disk drive that has failed, by, for each data block that the first spare programmable disk drive has not yet stored:
      retrieving data and parity information relevant to the data block from the other programmable disk drives of the RAID;
      reconstructing the data block from the data and the parity information; and
      storing the data block at a position on the spare programmable disk drive identical to a position on the programmable disk drive that has failed on which the particular data block was stored.

6. The non-transitory computer-readable data storage medium of claim 1, wherein the method further comprises, in response to determining that the programmable disk drive has failed:
   determining whether the programmable disk drive is still able to communicate with the other programmable disk drives over a network; and
   in response to determining that the programmable disk drive is still able to communicate with the other programmable disk drives over the network, instructing, by the spare programmable disk drive, the programmable disk drive to go offline;
   assuming, by the spare programmable disk drive, a network address of the programmable disk drive that has gone offline.

7. A method comprising:
   taking over for a failed programmable disk drive configured within a peer-to-peer redundant array of independent disks (RAID) including a plurality of other programmable disk drives, by a spare programmable disk drive, the peer-to-peer RAID lacking a RAID controller;
   for a data block of the failed programmable disk drive to be reconstructed by the spare programmable disk drive, sending a request to a first programmable disk drive of the other programmable disk drives, by the spare programmable disk drive;
   in response to the first programmable disk drive receiving the request, sending data relevant to reconstructing the data block from the first programmable disk drive to a next programmable disk drive of the other programmable disk drives;

performing, by each other programmable disk drive as a given other programmable disk drive, from the next programmable disk drive to a next-to-last programmable disk drive:

receiving the data relevant to reconstructing the data block from an immediately prior programmable disk drive;

performing an exclusive-or (XOR) logic operation in relation to the received data relevant to reconstructing the data block and additional data relevant to reconstructing the data block stored by the given other programmable disk drive, yielding XOR'ed data;

sending the XOR'ed data, as the data relevant to reconstructing the data block, to the other programmable disk drive that is immediately subsequent to the given other programmable disk drive;

receiving, by the last programmable disk drive of the other programmable disk drives, the data relevant to reconstructing the data block from the next-to-last programmable disk drive;

performing, by the last programmable disk drive, the XOR logic operation in relation to the received data relevant to reconstructing the data block and additional data relevant to reconstructing the data block stored by the last programmable disk drive, yielding the data block as reconstructed;

sending the data block as reconstructed from the last programmable disk drive to the spare programmable disk drive; and storing the data block as reconstructed by the spare programmable disk drive.

8. The method of claim 7, wherein for the data block to be reconstructed, each other programmable disk drive sends just one piece of data, which is the data relevant to reconstructing the data block, wherein for the data block to be reconstructed, each other programmable disk drive receives just one piece of data, which for the first programmable disk drive is the request received from the spare programmable disk drive, and which for every other programmable disk drive except for the first programmable disk drive is the data relevant to reconstructing the data block received from the immediately prior other programmable disk drive, and wherein for the data block to be reconstructed, the spare programmable disk drive receives just one piece of data, which is the data block as reconstructed received from the last programmable disk drive.

9. The method of claim 7, wherein the spare programmable disk drive repeatingly sends another request for another data block of the failed programmable disk drive to the first programmable disk drive after sending a prior request for a prior data block of the failed programmable disk drive to the first programmable disk drive, until a number of outstanding requests sent by the spare programmable disk drive for which data blocks as reconstructed have not yet been received from the last programmable disk drive is equal to a number of the other programmable disk drives.

10. The method of claim 9, wherein once the number of outstanding requests sent by the spare programmable disk drive is equal to the number of the other programmable disk drives, every time the spare programmable disk drive receives a given data block as reconstructed from the last programmable disk drive, the spare programmable disk drive sends another request for another data block of the failed programmable disk drive, until requests have been sent for all data blocks of the failed programmable disk drive.

11. The method of claim 7, wherein the additional data relevant to reconstructing the data block stored by the given other programmable disk drive is one of:

a different data block of a same code block as the data block to be reconstructed;

parity information for the same code block.

12. A system comprising:

a network;

a plurality of programmable disk drives to communicate with one another over the network and that are organized as a peer-to-peer redundant array of independent disks (RAID) that lacks a RAID controller;

a first spare programmable disk drive and a second spare programmable disk drive, each of which is to monitor a particular programmable disk drive of the programmable disk drives, and one of which is to replace the particular programmable disk drive within the RAID and is to reconstruct data on the particular programmable disk drive in a specified manner when the particular programmable disk drive has failed, wherein in the specified manner, for a data block of the particular programmable disk drive to be reconstructed, each programmable disk drive other than the particular programmable disk drive receives just one piece of data and sends just one piece of data.

13. The system of claim 12, wherein the first spare programmable disk drive has lower priority in replacing the particular programmable disk drive than the second spare programmable disk drive, wherein in response to the first spare programmable disk drive detecting that the particular programmable disk drive has failed, the first spare programmable disk drive is to send a message to the second spare programmable disk drive asking the second spare programmable disk drive whether the second spare programmable disk drive is replacing the particular programmable disk drive within the RAID, in response to the first spare programmable disk drive failing to receive a reply from the second spare programmable disk drive indicating that the second spare programmable disk drive is replacing the particular programmable disk drive within the RAID, the first spare programmable disk drive is to replace the particular programmable disk drive within the RAID; and in response to the first spare programmable disk drive receiving the reply from the second spare programmable disk drive indicating that the second spare programmable disk drive is replacing the particular programmable disk drive within the RAID, the first spare programmable disk drive is not to replace the particular programmable disk drive within the RAID.

14. The system of claim 13, wherein in response to the second spare programmable disk drive detecting that the particular programmable disk drive has failed, the second spare programmable disk drive is to replace the particular programmable disk drive within the RAID without asking the first spare programmable disk drive.

15. The system of claim 12, wherein the one of the first spare programmable disk drive and the second spare programmable disk drive that is to replace the particular programmable disk drive within the RAID is a given spare programmable disk drive and is to reconstruct the data on the particular programmable disk drive by:

in response to receiving an input/output (I/O) request for a particular data block of the particular programmable disk drive that has failed:

retrieving data and parity information relevant to the particular data block from other of the programmable disk drives of the RAID;

reconstructing the particular data block from the data and the priority information;

storing the particular data block at a position on the given spare programmable disk drive identical to a position on the particular programmable disk drive on which the particular data block was stored; and responding to the request with the particular data block.

16. The system of claim 12, wherein the one of the first spare programmable disk drive and the second spare programmable disk drive that is to replace the particular programmable disk drive within the RAID is a given spare programmable disk drive, wherein the given spare programmable disk drive is to repeatedly send a request for a data block of the particular programmable disk drive to a first programmable disk drive of other of the programmable disk drives of the RAID after sending a prior request for a prior data block of the particular programmable disk drive to the first programmable disk drive, until a number of outstanding requests sent by the given spare programmable disk drive for which data blocks as reconstructed have not yet been received from a last programmable disk drive of the other of the programmable disk drives is equal to a number of the other of the programmable disk drives, wherein once the number of outstanding requests sent by the given spare programmable disk drive is equal to the number of the other of the programmable disk drives, every time the given spare programmable disk drive receives a given data block as reconstructed from the last programmable disk drive, the given spare programmable disk drive is to send another request for another data block of the particular programmable disk drive, until requests have been sent for all data blocks of the particular programmable disk drive.

17. The system of claim 12, wherein the one of the first spare programmable disk drive and the second spare programmable disk drive that is to replace the particular programmable disk drive within the RAID is a given spare programmable disk drive, wherein the data on the particular programmable disk drive is reconstructed on the given spare programmable disk drive by, for each data block of a plurality of data blocks of the particular programmable disk drive:

the given spare programmable disk drive sending a request to a first programmable disk drive of other of the programmable disk drives;

in response to the first programmable disk drive receiving the request, the first programmable disk drive sending data relevant to reconstructing the data block from the to a next programmable disk drive of the other of the programmable disk drives;

each of the other of the programmable disk drives, from the next programmable disk drive to a next-to-last programmable disk drive:

receiving the data relevant to reconstructing the data block from an immediately prior programmable disk drive;

performing an exclusive-or (XOR) logic operation in relation to the received data relevant to reconstructing the data block and additional data relevant to reconstructing the data block stored by the given other programmable disk drive, yielding XOR'ed data;

sending the XOR'ed data, as the data relevant to reconstructing the data block, to the programmable disk drive that is immediately subsequent thereto;

the last programmable disk drive of the other of the programmable disk drives receiving the data relevant to reconstructing the data block from the next-to-last programmable disk drive;

the last programmable disk drive performing the XOR logic operation in relation to the received data relevant to reconstructing the data block and additional data relevant to reconstructing the data block stored by the last programmable disk drive, yielding the data block as reconstructed;

the last programmable disk drive sending the data block as reconstructed from the last programmable disk drive to the given spare programmable disk drive; and the given spare programmable disk drive storing the data block as reconstructed.

18. The system of claim 12, wherein a plurality of logical volumes are defined on the RAID, wherein each of the logical volumes includes a different portion of the data blocks, and wherein the data blocks of the different portion of each of the logical volumes is stored completely on a different one of the programmable disk drives.

19. The system of claim 12, wherein each programmable disk drive of the RAID stores both data blocks and parity information, wherein each programmable disk drive of the RAID has a first partition to store just the data blocks and a second partition to store just the parity information, the first partition and the second partition physically separate from one another.

20. The system of claim 12, wherein each programmable disk drive of the first spare programmable disk drive, the second spare programmable disk drive, and the programmable disk drives organized as the RAID comprises:

a network adapter to communicate over the network to participate in the RAID;

a processor; and a memory storing computer-executable code that the processor executes to participate in the RAID.

* * * * *